United States Patent
Brinkemper et al.

(10) Patent No.: US 7,197,367 B2
(45) Date of Patent: Mar. 27, 2007

(54) HOUSEHOLD APPLIANCE COMPRISING A CONTROL ELEMENT AND A DISPLAY ELEMENT

(75) Inventors: Klaus Brinkemper, Rheda-Wiedenbrueck (DE); Michael Buehlmeyer, Harsewinkel (DE); Norbert Fox, Herzebrock (DE); Uwe Hahn, Guetersloh (DE); Tobias Heidemann, Melle (DE); Joerg Nattkemper, Hamm (DE); Detlef Niehaus, Hamm (DE); Margit Pohlueke, Guetersloh (DE)

(73) Assignee: Miele & Cie. KG, Guetersloh (DE)

( * ) Notice: Subject to any disclaimer, the term of this patent is extended or adjusted under 35 U.S.C. 154(b) by 0 days.

(21) Appl. No.: 10/493,264

(22) PCT Filed: Oct. 30, 2002

(86) PCT No.: PCT/EP02/12093

§ 371 (c)(1),
(2), (4) Date: Sep. 17, 2004

(87) PCT Pub. No.: WO03/037151

PCT Pub. Date: May 8, 2003

(65) Prior Publication Data

US 2005/0016385 A1 Jan. 27, 2005

(30) Foreign Application Priority Data

Nov. 2, 2001 (DE) ............................... 101 54 046

(51) Int. Cl.
*G06F 19/00* (2006.01)
(52) U.S. Cl. .......................... 700/90; 700/18; 366/144; 340/82

(58) Field of Classification Search .................. 700/65, 700/18, 19, 20, 86–88, 22, 90; 99/327, 348; 366/144–146; 129/702, 678, 506, 413; 707/10; 340/825, 428
See application file for complete search history.

(56) References Cited

U.S. PATENT DOCUMENTS

| 5,530,230 | A | | 6/1996 | Smith et al. ................. 219/723 |
| 5,710,409 | A | * | 1/1998 | Schwarzbacker et al. ... 219/506 |
| 5,967,021 | A | * | 10/1999 | Yung ............................ 99/327 |

(Continued)

FOREIGN PATENT DOCUMENTS

DE 197 01 033 7/1997

(Continued)

*Primary Examiner*—Kidest Bahta
(74) *Attorney, Agent, or Firm*—Darby & Darby P.C.

(57) ABSTRACT

The present invention relates to a household appliance including at least one control element and at least one display element, the control element(s) being able to be used to select programs of which, in each case, at least one program parameter is settable via the control element(s), and further including a program control including a data processing means and a data memory; the control and display elements as well as the data memory being in data communication with the data processing means.

In order to improve clarity and to allow user-modified programs to be called up repeatedly, a setting of the program parameter(s) is assigned to a user identification, storable under this user identification, and able to be called up by the selection of a program made via the control element(s) (6, 10).

12 Claims, 2 Drawing Sheets

U.S. PATENT DOCUMENTS

| | | | |
|---|---|---|---|
| 6,095,031 A | 8/2000 | Warne | 99/282 |
| 6,137,095 A * | 10/2000 | Kashimoto et al. | 219/702 |
| 6,237,811 B1 | 5/2001 | Ford | 222/129.1 |
| 6,324,964 B1 | 12/2001 | Niederberger et al. | 99/287 |
| 6,400,996 B1 * | 6/2002 | Hoffberg et al. | 700/83 |
| 6,425,156 B1 | 7/2002 | Knopp et al. | 8/156 |
| 6,549,181 B2 * | 4/2003 | Sakai et al. | 700/90 |
| 6,660,982 B2 * | 12/2003 | Thorneywork | 219/702 |
| 6,850,252 B1 * | 2/2005 | Hoffberg | 715/716 |
| 6,915,733 B1 | 7/2005 | Langbauer | 99/319 |
| 2003/0084047 A1 * | 5/2003 | Williamson | 707/10 |
| 2004/0160335 A1 * | 8/2004 | Reitmeier | 340/825 |
| 2005/0055472 A1 * | 3/2005 | Krzyzanowski et al. | 710/5 |

FOREIGN PATENT DOCUMENTS

| | | |
|---|---|---|
| DE | 37 09 670 A1 | 10/1998 |
| DE | 197 49 657 A1 | 5/1999 |
| DE | 198 24 080 A1 | 12/1999 |
| DE | 100 27 766 A1 | 5/2001 |
| WO | 9934716 | 7/1999 |
| WO | 0071010 | 11/2000 |
| WO | WO 00/65827 | 11/2000 |

* cited by examiner

HOUSEHOLD APPLIANCE COMPRISING A CONTROL ELEMENT AND A DISPLAY ELEMENT

The present invention relates to a household appliance having at least one control element and at least one display element, the control element being useable to select programs, a setting of a program parameter of a program being assigned to, storable under, and retrievable under, an identification.

BACKGROUND

A household appliance having a control element and a display element is known, for example, from German Patent DE 197 01 033 C2. This household appliance has a display element and various control elements which are arranged in an ergonomically and visually advantageous manner. Moreover, this known household appliance includes a control unit which, for example, allows information about the operation of the household appliance to be set via the control elements and to be displayed via the display element. Furthermore, the known household appliance can be programmed to support display in different languages.

The known household appliance has the disadvantage that the use of a plurality of programs, program parameters and setting options for the parameters results in impaired clarity. However, consumer behavior is increasingly characterized by individual preferences, which leads to an increase in setting options of household and kitchen appliances. The adaptation of household appliances to increased customer requirements, i.e., allowing appliances to be set to personal preferences, leads to a further disadvantage of the known appliances: when used by several users, individual settings must be reentered each time the user changes.

SUMMARY OF THE INVENTION

It is therefore an object of the present invention to provide a household appliance which provides improved clarity when a plurality of programs, program parameters and setting options for the program parameters are available, and which allows programs that are modified by or for a user or user group to be called up repeatedly.

The present invention provides a household appliance including at least one display element, at least one control element, and a program control module. The control element is configured to: set and select a plurality of user identifications; set a first program parameter setting, the first program parameter setting being useable for a first program sequence of a first program and for a second program sequence of a second program; assign the first program parameter setting to a first user identification of the plurality of user identifications; store the first program parameter setting under the first user identification; select, under the first user identification, the first program so as to retrieve the first program parameter setting; and select, under the first user identification, the second program so as to retrieve the first program parameter setting. The program control module includes a data processing device and a data memory. The control element, the display element, and the data memory are in data communication with the data processing device.

In addition to improved clarity, which simplifies the operation of the household appliance, a particular advantage that can be achieved with the present invention is that a setting of the program parameter(s) selected by or for a user or user group is stored under a user identification, and can be called up by selecting a program, allowing repeated use of programs that have been modified by or for a user or user group. In the case of repeated use by a user or user group having similar preferences, the operation is made much easier, thus saving considerable time, especially when a plurality of programs, program parameters and setting options for the program parameter are available, and in the case of frequently changing users.

In principle, the control and display elements are freely selectable in terms of the functions assigned thereto. Suitably, a first control element is designed to select the program, and a second control element is designed to select and set the program parameter, as well as to assign the setting to the user identification; the first control element being associated with a first display element and the second control element being associated with a second display element.

In an embodiment of the present invention, by setting at least a first program parameter in a first program, a second program parameter corresponding to the first program parameter is set in a second program. This eliminates the need to repeatedly set a program parameter for different programs, thus allowing simple and time-saving modification of several programs.

In a further embodiment, at least one control element has a key. Keys are suitable components for confirming entries or settings and, in addition, are inexpensive.

In the aforementioned embodiment, at least one control element may be a rotary encoder with an integrated key feature. In this manner, programs, program parameters and settings of the parameters can be quickly selected in fine steps.

In another embodiment of the present invention, a protective means is provided to prevent unauthorized or unwanted entry of settings under a user identification, thus preventing inadvertent or improper change of the settings stored under a user identification.

In the aforementioned embodiment, access to a user identification may be password-protected. Thus, access is restricted in a simple and largely reliable manner.

In embodiment of the present invention, the input selection of an individual user identification or from a group of user identifications is displayable on the first and/or second display element(s). In this manner, while operating the household appliance, the user is constantly informed of whether he/she uses a particular user identification. Furthermore, it is possible to display the name of the particular user identification as well.

In another embodiment, one user identification is in the form of a standard user identification; the data processing means automatically switching from any user identification to the standard user identification as a function of a predetermined switching criterion. This allows the user, for example, to enter, store and call up settings under a standard user identification that is freely accessible to all. This also provides reliable protection against unwanted settings under the other user identifications in case the other user identifications are not protected by protective means.

If the household appliance according to the present invention is a beverage preparing device, in an embodiment the setting of at least one program parameter can be stored under the user identification by the dispensing operation. This further simplifies the operation, because one control operation will both cause the beverage to be dispensed, and store the setting.

BRIEF DESCRIPTION OF THE DRAWINGS

An exemplary embodiment of the present invention is shown in the drawings schematically and will be described in more detail below.

Figure 2:
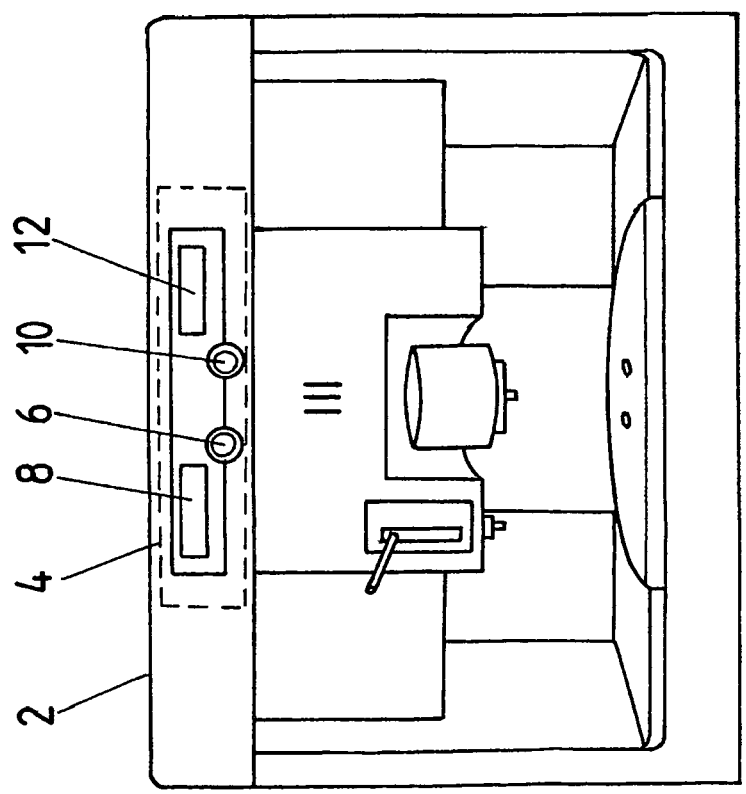

In this exemplary embodiment, control elements 6 and 10 are designed as rotary encoders with an integrated key feature so that the programs, program parameters and user identifications associated with control and display elements 6, 8 and 10, 12, respectively, are displayed highlighted in color by rotating control element 6, 10 clockwise or counterclockwise, and are selected by operating the key feature of control element 6, 10. Display elements 8, 12 are designed as graphics displays so that both plain text and graphic symbols and numbers can be displayed individually or in combination. Since the beverage preparing device of FIG. 2 is a compact device, the contents that appear on display elements 8, 12 are structured hierarchically so that display elements 8, 12 are designed in a space-saving manner. Moreover, the associated control and display elements 6 and 8 as well as 10 and 12, respectively, are disposed close together to further improve the clarity of operation. Clarity is also improved by a greater distance of control and display elements 6 and 8 with respect to control and display elements 10 and 12.

DETAILED DESCRIPTION

Also provided in the above exemplary embodiment is a program control (not shown) including a microprocessor as the data processing means as well as a data memory. Control and display elements 6, 8, 10 and 12 as well as the data memory are connected via electrical conductors to the microprocessor, allowing data exchange between the microprocessor and display elements 6, 8, 10 and 12 and the data memory. In this manner, it is possible to make settings to the program parameters via control elements 6 and 10, to assign these settings to a user identification which is also entered via control elements 6 and 10, and to store these settings under this user identification. If the beverage preparing device is activated under a user identification, then selection of a program via control element 6 will cause the program parameters required for executing the selected program to be called up from the data memory along with their settings, and to be used for the program sequence. For reasons of space and, in particular, because of technical requirements, the program control of the beverage preparing device according to the present invention is only partially disposed in close proximity to control and display panel 4, and is in communication, via electrical conductors (not shown), with a power section (also not shown in FIG. 1) so that signals are exchanged between the microprocessor and the power section.

Figure 1:
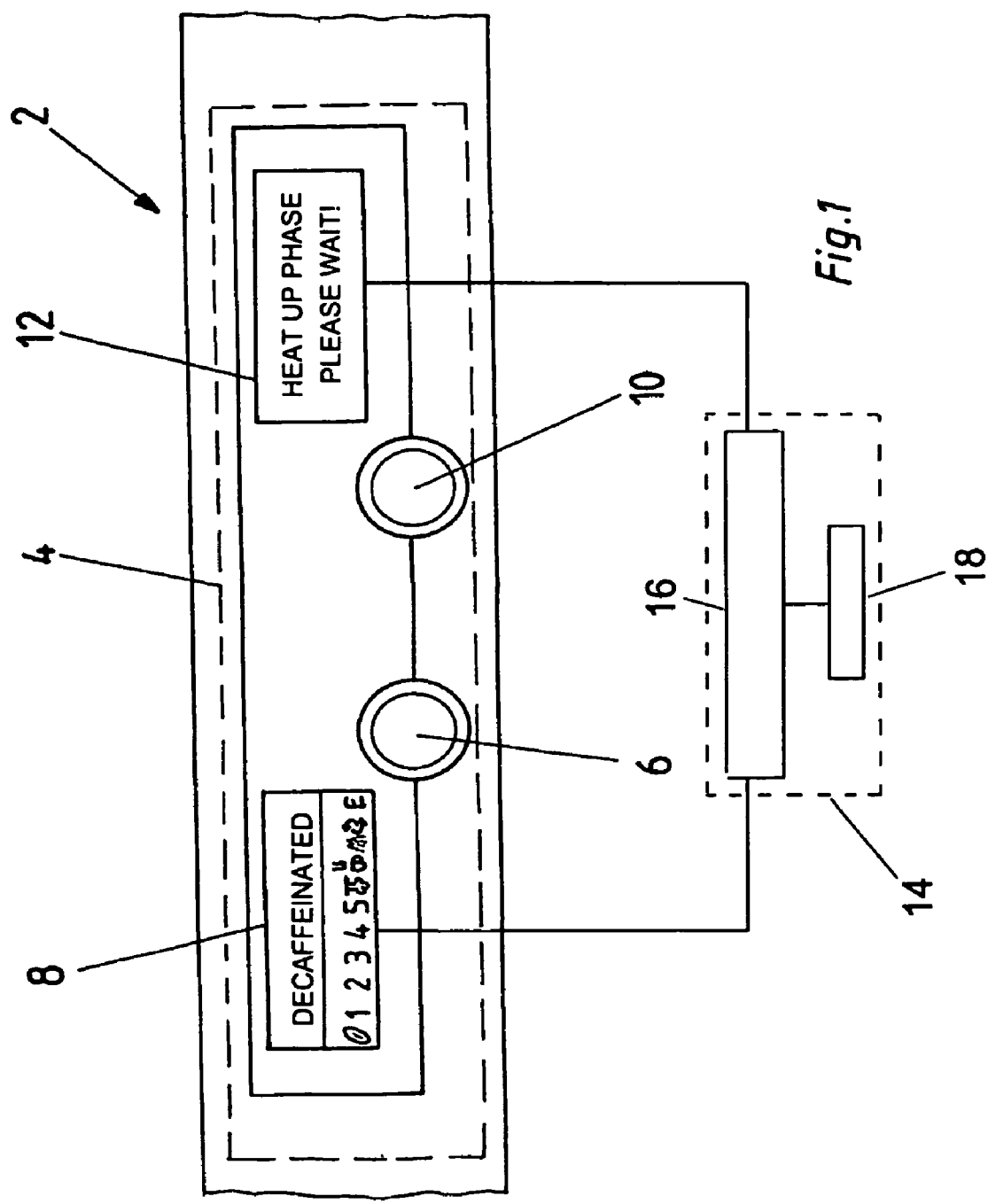
FIG. 1 shows a detail of a household appliance according to the present invention in a partial and simplified view.

FIG. 2 is a simplified view of the beverage preparing device 2 of FIG. 1 as a household appliance according to the present invention. The detail shown in FIG. 1 is located in the upper region of the beverage preparing device depicted in FIG. 2.

Also provided in the above exemplary embodiment is a program control module 14 including a microprocessor 16 as the data processing means as well as a data memory 18. Control and display elements 6, 8, 10 and 12 as well as the data memory 18 are connected via electrical conductors to the microprocessor 16, allowing data exchange between the microprocessor and display elements 6, 8, 10 and 12 and the data memory. In this manner, it is possible to make settings to the program parameters via control elements 6 and 10, to assign these settings to a user identification which is also entered via control elements 6 and 10, and to store these settings under this user identification. If the beverage preparing device is activated under a user identification, then selection of a program via control element 6 will cause the program parameters required for executing the selected program to be called up from the data memory 18 along with their settings, and to be used for the program sequence. For reasons of space and, in particular, because of technical requirements, the program control module 14 of the beverage preparing device according to the present invention is only partially disposed in close proximity to control and display panel 4, and is in communication, via electrical conductors, with a power section so that signals are exchanged between the microprocessor 16 and the power section.

FIG. 2 is a simplified view of the beverage preparing device 2 of FIG. 1. The detail shown in FIG. 1 is located in the upper region of the beverage preparing device depicted in FIG. 2.

Furthermore, the user has the possibility to change the program parameter settings. The program parameters intended to be set by the user include, for example, the following: cup size, volume and temperature level of a small cup, a large cup, and of a cup for which the double amount of coffee is used, language, and illumination setting. In this exemplary embodiment, the program parameters are all set and stored by starting the dispensing operation, except for the latter three, which are set and stored using the setting mode. In both cases, storage is done under the previously selected user identification. In this exemplary embodiment, a setting made in one program sets the corresponding program parameter in another program in the case of the following program parameters: volume and temperature level of the small cup, the large cup, and of the cup for which the double amount of coffee is used. For example, all programs using a large cup are intended to dispense the same amount.

Beverage preparing device 2 of FIG. 2 is turned off and its heating element is at operating temperature. When operating the key feature of control element 10, the user identification that was used last appears on display element 12. The user can display the existing user identifications in succession on display element 12 by turning control element 10. The desired user identification is selected by user the by operating the key feature of control element 10. Operation of the key feature of control element 6 turns on the beverage preparing device 2, and the settings of a last dispensing operation carried out under this user identification are transferred from the data memory 18 to the microprocessor 16, and are partially indicated on display elements 8 and 12. For example, the type of coffee of the last dispensing operation is indicated as a program on display element 8, and the cup size that was used last for this type of coffee is indicated on display element 12 as the program parameter. As can be seen from FIG. 1, other information and instructions are also displayed. If, at the time the beverage preparing device 2 is turned on, its heating element has not yet reached operating temperature, then, for example, the message "Warming up. Please wait!" appears on display element 12. If the user wishes to accept the program parameter settings, he/she starts the dispensing operation by operating the key feature of control element 10 once more. This starts the program which ultimately causes the type of coffee to be dispensed that was used for the last dispensing operation under the user identification. The program parameter settings of this program that are stored under the user identification are used by the microprocessor 16 for the program sequence. Using control element 6, the user can also select other programs; program parameter settings of these programs that are stored correspondingly under the user identification being used for the program sequence of these programs.

Furthermore, it is possible to provide a start and stop time as a program parameter for a standby mode in which, for example, the heating element of beverage preparing device 2 is automatically maintained at operating temperature while other functions are disabled.

Moreover, the user identification can be used to charge for the amount of coffee used in a personalized manner. Since the exemplary embodiment includes a Nespresso system, in which the coffee is portioned in capsules, this can be done in a particularly simple way by counting the capsules. In order to prevent misuse, it is possible to link access to the respective user identification along with the entry of a password.

When beverage preparing device 2 is turned on, the program parameter settings made can also be stored by the user under a new user identification. To this end, the user turns control element 6 until the letter "E" for the setting mode is highlighted in color on display element 8. In this manner, the setting mode is selected, and the parameters that can be set using the setting mode are indicated on display element 12. The user turns control element 10 until a symbol for a programming mode is highlighted in color on display element 12. Operation of the key feature of control element 10 selects the programming mode, and the settable parameters are indicated on display element 12. The user turns control element 10 until a symbol for a user identification setting mode is highlighted in color on display element 12. Operation of the key feature of control element 10 selects the user identification setting mode, and the new user identification is entered via control element 10 as described above. The selection is indicated on display element 12. Once the entry is completed, it is confirmed via control element 10, and the program parameter settings made are automatically stored under the new user identification.

Due to the functional and spatial association of control element 6 and 10 to display element 8 and 12, respectively, the beverage preparing device 2, as a household appliance according to the present invention, is improved over the known household appliances in terms of clarity. Since program parameters settings made can be associated with user identifications, stored under these user identifications, and called up by selecting a program, the operation is made much easier even in the case of frequently changing users and a plurality of programs, program parameters and setting options for the parameters, which further improves clarity.

What is claimed is:

1. A household appliance comprising:
   at least one display element;
   at least one control element configured to:
      set and select a plurality of user identifications;
      set a first program parameter setting, the first program parameter setting being useable for a first program sequence of a first program and for a second program sequence of a second program;
      assign the first program parameter setting to a first user identification of the plurality of user identifications;
      store the first program parameter setting under the first user identification;
      select, under the first user identification, the first program so as to retrieve the first program parameter setting; and
      select, under the first user identification, the second program so as to retrieve the first program parameter setting; and
   a program control module including a data processing device and a data memory, the at least one control element, the at least one display element, and the data memory being in data communication with the data processing device.

2. The household appliance as recited in claim 1 wherein:
   the at least one display element includes a first and a second display element; and
   the at least one control element includes a first control element and a second control element, the first control element being associated with the first display element and configured to select the first and second programs, the second control element being associated with a second display element and configured to select and set the first program parameter setting and to assign the first program parameter setting to the first user identification.

3. The household appliance as recited in claim 1 wherein the at least one control element is configured to set the first program parameter setting in the first program so as to set, in a third program, a third program parameter setting corresponding to the first program parameter setting.

4. The household appliance as recited in claim 1 wherein the at least one control element has a key.

5. The household appliance as recited in claim 1 wherein the at least one control element includes a rotary encoder having an integrated key feature.

6. The household appliance as recited in claim 1 further comprising a protective device for preventing unauthorized or unwanted entry of a second program parameter setting under a second user identification of the plurality of user identifications.

7. The household appliance as recited in claim 6 wherein the protective device includes password protection of access to the second user identification.

8. The household appliance as recited in claim 1 wherein an input selection of the first user identification or a group of user identifications of the plurality of user identifications is displayable on at least one of a first and a second display element of the at least one display element.

9. The household appliance as recited in claim 1 wherein:
   a second user identification of the plurality of user identifications has a form of a standard user identification; and
   the data processing device is configured to automatically switch from any of the plurality of user identifications to the standard user identification as a function of a predetermined switching criterion.

10. The household appliance as recited in claim 1 wherein:
    the household appliance includes a beverage preparing device; and
    the at least one control element is configured to store the first program parameter setting under the first user identification by the dispensing operation.

11. The household appliance as recited in claim 1 wherein:
    the household appliance includes a beverage preparing device; and
    the first and second programs respectively include at least one of a respective dispensing of a respective type of coffee, rinsing operation, descaling operation, dispensing of hot water, dispensing of water vapor, and setting operation.

12. The household appliance as recited in claim 11 wherein the first and second program parameters respectively include at least one of a respective cup size, temperature level, illumination, language, water hardness, automatic on time of the beverage preparing device, and automatic off time of the beverage preparing device.

* * * * *